(12) United States Patent
Ohdate et al.

(10) Patent No.: US 6,704,464 B2
(45) Date of Patent: *Mar. 9, 2004

(54) IMAGE PROCESSING APPARATUS AND METHOD, AND STORAGE MEDIUM

(75) Inventors: Takayoshi Ohdate, Oume (JP); Hirotaka Shiiyama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,700

(22) Filed: Jul. 27, 1998

(65) Prior Publication Data

US 2002/0057851 A1 May 16, 2002

(30) Foreign Application Priority Data

Jul. 31, 1997 (JP) .............................................. 9-206096

(51) Int. Cl.$^7$ ................................................ G06K 9/54
(52) U.S. Cl. ........................................ 382/305; 358/403
(58) Field of Search ................................. 382/305–306, 382/209, 173, 180, 162, 165; 707/1–6, 521–522, 500, 515, 516, 104.1; 358/403–404, 450–452, 537, 296; 345/589, 762–765, 549; 715/500.1

(56) References Cited

U.S. PATENT DOCUMENTS

| | | | | |
|---|---|---|---|---|
| 5,159,667 A | * | 10/1992 | Borrey et al. ............... | 715/500 |
| 5,533,186 A | * | 7/1996 | Tanahashi et al. .......... | 345/549 |
| 5,712,713 A | * | 1/1998 | Hamanaka et al. ......... | 358/451 |
| 5,764,368 A | * | 6/1998 | Shibaki et al. .............. | 358/296 |
| 5,913,205 A | * | 6/1999 | Jain et al. ...................... | 707/2 |
| 5,999,664 A | * | 12/1999 | Mahoney et al. ........... | 382/305 |
| 6,247,009 B1 | * | 6/2001 | Shiiyama et al. ............... | 707/3 |
| 6,333,748 B1 | * | 12/2001 | Takiguchi et al. .......... | 345/589 |
| 6,400,853 B1 | * | 6/2002 | Shiiyama .................... | 382/305 |

* cited by examiner

*Primary Examiner*—Leo Boudreau
*Assistant Examiner*—Ishrat Sherali
(74) *Attorney, Agent, or Firm*—Fitzpatrick, Cella, Harper & Scinto

(57) ABSTRACT

An image data selecting unit selects image data which stores image attribute information to be additionally registered, and image data to which new image attribute information is to be additionally registered, from those displayed by a search result display unit. An image attribute information additional registration unit additionally registers image attribute information selected by an image attribute information selecting unit to the image data which is selected by the image data selecting unit and to which the new image attribute information is to be additionally registered. By automatically assigning attribute information which is not assigned upon registration of image data, the load on the user upon registration is reduced.

17 Claims, 9 Drawing Sheets

FIG. 5

| PROPERTY NAME | ID CODE | TYPE |
|---|---|---|
| NUMBER OF RESOLUTIONS | 0×01000000 | VT_UI4 |
| HIGHEST RESOLUTION WIDTH | 0×01000002 | VT_UI4 |
| HIGHEST RESOLUTION HEIGHT | 0×01000003 | VT_UI4 |
| DEFAULT DISPLAY HEIGHT | 0×01000004 | VT_R4 |
| DEFAULT DISPLAY WIDTH | 0×01000005 | VT_R4 |
| DISPLAY HEIGHT/ WIDTH UNITS | 0×01000006 | VT_R4 |

| PROPERTY NAME | ID CODE | TYPE |
|---|---|---|
| SUBIMAGE WIDTH | 0×02*ii*0000 | VT_UI4 |
| SUBIMAGE HEIGHT | 0×02*ii*0001 | VT_UI4 |
| SUBIMAGE COLOR | 0×02*ii*0002 | VT_BLOB |
| SUBIMAGE NUMERICAL FORMAT | 0×02*ii*0003 | VT_UI4 \| VT_VECTOR |
| DEIMATION METHOD | 0×02*ii*0004 | VT_I4 |
| DEIMATION PREFILTER WIDTH | 0×02*ii*0005 | VT_R4 |
| SUBIMAGE ICC PROFILE | 0×02*ii*0007 | VT_UI2 \| VT_VECTOR |

| PROPERTY NAME | ID CODE | TYPE |
|---|---|---|
| JPEG TABLES | 0×03*ii*0001 | VT_BLOB |
| MAXIMUM JPEG TABLE INDEX | 0×03000002 | VT_UI4 |

FIG. 6

| | |
|---|---|
| FILE SOURCE | 601 |
| INTELLECTUAL PROPERTY | 602 |
| CONTENT DESCRIPTION | 603 |
| CAMERA INFORMATION | 604 |
| PER PICTURE CAMERA SETTINGS | 605 |
| DIGITAL CAMERA CHARACTERIZATION | 606 |
| FILM DESCRIPTION | 607 |
| ORIGINAL DOCUMENT SCAN DESCRIPTION | 608 |
| SCAN DEVICE | 609 |

FIG. 7

| | |
|---|---|
| FILE SOURCE : SCANNING | 701 |
| INTELLECTUAL PROPERTY : COPYRIGHT FREE | 702 |
| CONTENT DESCRIPTION : SEASHORE SETTING SUN | 703 |
| CAMERA INFORMATION : CANON EOS | 704 |
| PER PICTURE CAMERA SETTINGS : FOCAL DISTANCE 10m WITHOUT FLUSHING | 705 |
| DIGITAL CAMERA CHARACTERIZATION : NO INFORMATION | 706 |
| FILM DESCRIPTION : COLOR FILM | 707 |
| ORIGINAL DOCUMENT SCAN DESCRIPTION : NO INFORMATION | 708 |
| SCAN DEVICE : SCANNED BY TARO YAMADA | 709 |

| CONTENT DESCRIPTION 801 | IMAGE DATA NO. 802 | IMAGE DATA NO. 803 | IMAGE DATA NO. 804 |
|---|---|---|---|
| MOUNTAIN | AAA | | |
| APPLE | BBB | DDD | |
| CHILD | CCC | | |
| | | | |

FIG. 10

IMAGE PROCESSING APPARATUS AND METHOD, AND STORAGE MEDIUM

BACKGROUND OF THE INVENTION

1. Field of the Invention

The present invention relates to an image processing apparatus and method, which register and search image data.

2. Related Background Art

In a conventional image processing apparatus, the user must manually register a keyword that describes the contents of the image data to be registered, and image attribute information such as the photographing date and location of the image, and the like upon registering the image data. Also, an apparatus which automatically extracts an image feature from image data by performing image processing, and registers the extracted image feature as additional information in correspondence with image data is available.

However, in the conventional image processing apparatus, in order to obtain a desired image by a search, the user must assign appropriate image attribute information to all the images to be registered, and the load upon registration becomes heavier as the number of image data becomes larger. Even when the image features are automatically registered, it is hard to obtain a satisfactory search result by that information alone. After all, since the user must assign keywords to all the images, a problem of a heavy registration load remains unsolved.

SUMMARY OF THE INVENTION

The present invention has been made in consideration of the above-mentioned problem, and has as its object to provide an image processing apparatus and method, which assign appropriate image attribute information to already registered image information in the course of repeating searches even when image attribute information is not assigned to all image data upon registration, thereby reducing the load on the user upon registration.

According to one embodiment of the present invention, there is provided an image processing apparatus comprising:

memory means for storing image data, and image attribute information corresponding to each image data;

image data searching means for searching image data; and image attribute information additional registration means for additionally registering image attribute information of the image data found by the image data searching means to another image data found thereby.

BRIEF DESCRIPTION OF THE DRAWINGS

FIG. 5 shows attribute information used in FlashPix;

FIG. 6 shows the format of a FlashPix Image Info. Property Set;

FIG. 7 shows an example of information stored in the respective fields of the FlashPix Image Info. Property Set;

FIG. 10 shows the search results obtained under a search condition "image captured by scanning"

DETAILED DESCRIPTION OF THE PREFERRED EMBODIMENTS

A preferred embodiment of the present invention will be described below with reference to the accompanying drawings.

Figure 1:
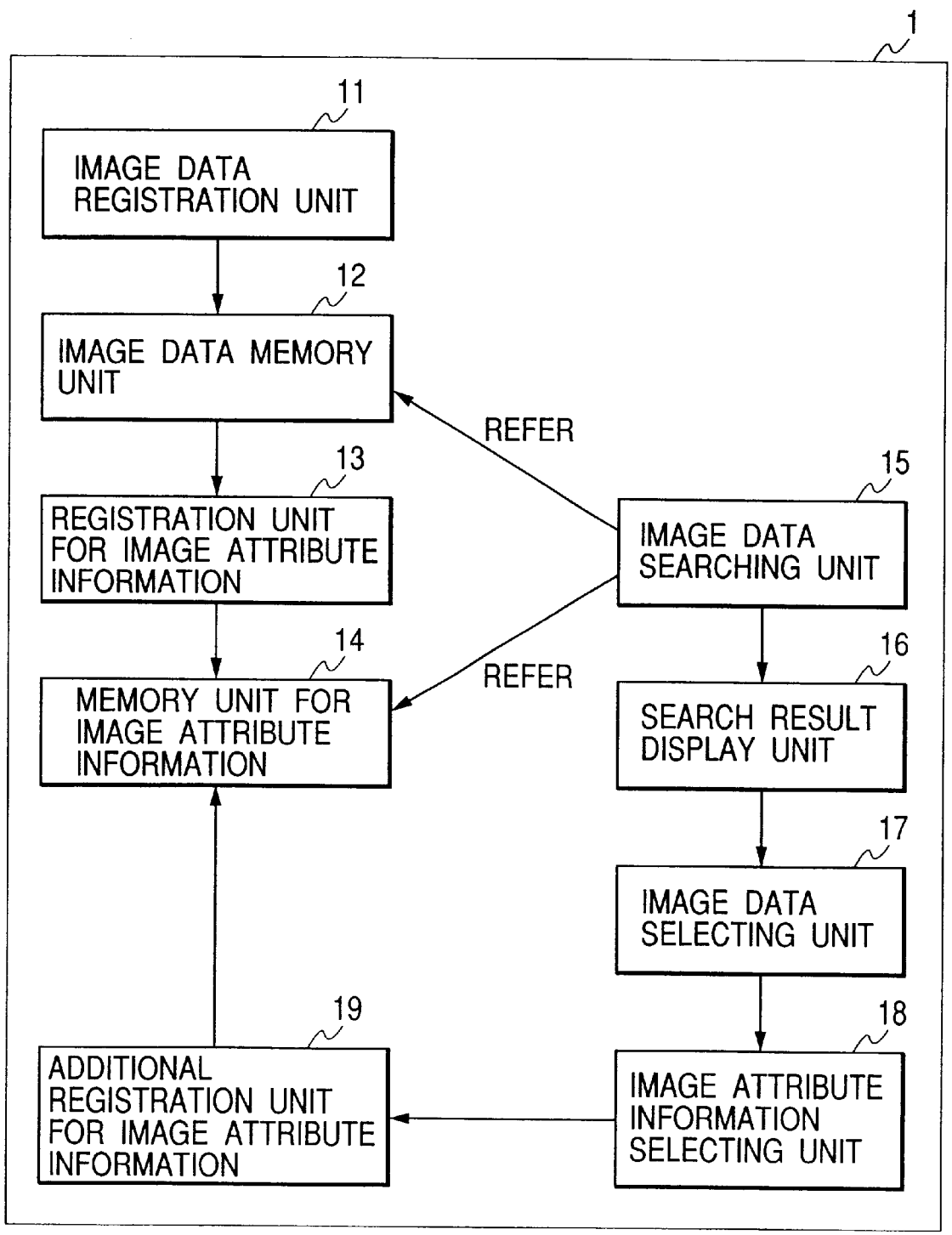
FIG. 1 is a block diagram showing the functional arrangement of an image processing apparatus according to an embodiment of the present invention.

FIG. 1 is a block diagram showing the functional arrangement of an image processing apparatus according to an embodiment of the present invention.

In FIG. 1, the overall image processing apparatus is represented by 1.

The image processing apparatus 1 of this embodiment mainly comprises of an image data registration unit 11, image data memory unit 12, image attribute information registration unit 13, image attribute information memory unit 14, image data searching unit 15, search result display unit 16, image data selecting unit 17, image attribute information selecting unit 18, and image attribute information additional registration unit 19.

The image data registration unit 11 captures and loads images from photographs, floppy disks, and the like, and registers image data in the image data memory unit 12. The image data registration unit 11 can also register image data received via a network.

The image data memory unit 12 stores image data registered by the image data registration unit 11.

The image attribute information registration unit 13 extracts image attribute information corresponding to image data so as to search image data stored in the image data memory unit 12, and registers the extracted image attribute information in the image attribute information memory unit 14. The image attribute information memory unit 14 stores a correspondence between the image data and image attribute information registered by the image attribute information registration unit 13.

The image data searching unit 15 designates image attribute information stored in the image attribute information memory unit 14 on the basis of the image attribute information designated by the user, and searches image data stored in the image data memory unit 12.

The search result display unit 16 displays image data obtained by the search by the image data searching unit 15.

With the functional arrangement of the above-mentioned units 11 to 16, a general image processing apparatus is implemented.

The image data selecting unit 17 provides a function of selecting image data that stores image attribute information to be additionally registered, and image data for which image attribute information is to be additionally registered, from the image data displayed by the search result display unit 16.

The image attribute information selecting unit 18 selects the image attribute information to be additionally registered.

The image attribute information additional registration unit 19 additionally registers the image attribute information selected by the image attribute information selecting unit 18 to the image data which is selected by the image data selecting unit 17 and to which the image attribute information is to be additionally registered.

According to the image processing apparatus 1 with the above-mentioned arrangement, even when image attribute information is assigned to not all image data upon registration of image data, the image attribute information can be assigned to image data by repeating a search without increasing the load on the user.

The arrangement and operation of the image processing apparatus of this embodiment will be described in more detail below with reference to the accompanying drawings.

Figure 2:
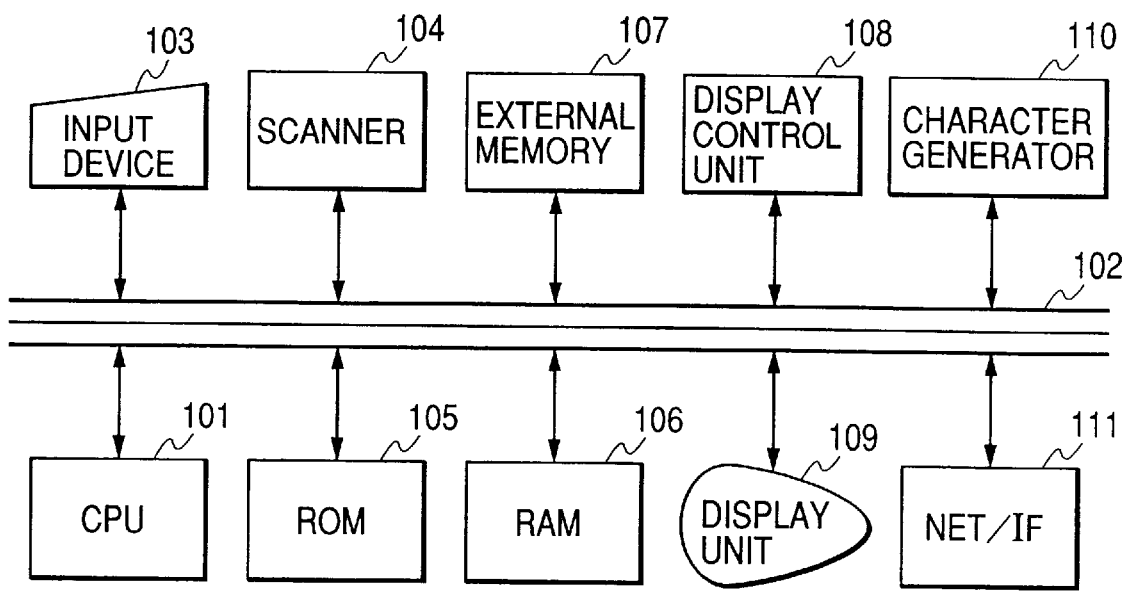
FIG. 2 is a block diagram showing the arrangement of the image processing apparatus according to the embodiment of the present invention.

FIG. 2 is a block diagram showing the arrangement of the image processing apparatus of this embodiment.

In FIG. 2, a CPU (microprocessor) 101 controls the respective building elements connected to a bus 102 via the bus 102 to attain registration of image data, registration of image attribute information, a search of image data, and so on, i.e., to implement the aforementioned functional arrangement. Note that the bus 102 is a common bus comprised of an address bus, control bus, and data bus. That is, using this bus 102, address signals, control signals, and various data are transferred among devices connected to the bus 102.

An input device 103 comprises a keyboard, mouse, and the like, and has a switch with a selecting function for designating operations associated with registration and search of images of the image processing apparatus.

A scanner 104 scans photographs, illustrations, and the like and captures them as image data into the apparatus. In this embodiment, image data scanned by the scanner 104 can be registered.

A ROM (read-only memory) 105 pre-stores the control sequence of the CPU 101, and with this sequence, various kinds of processing according to the present invention such as registration of image data, registration of image attribute information, a search of image data, and so forth, can be done.

A RAM (random access memory) 106 is used as a work memory when the CPU 101 executes various kinds of processing such as registration of image data, registration of image attribute information, a search of image data, and the like, and as a temporary memory upon controlling the respective building elements.

An external memory 107 provides a secondary memory, the memory contents of which do not disappear even after power-OFF. For example, the external memory 107 uses a hard disk (HD), magneto-optical disk (MO), CD-R, and the like. The external memory need not be equipped in the image processing apparatus of this embodiment but may reside on the network. In such case, the external memory corresponds to a database on the network. The external memory 107 provides various memory areas, such as a memory area in which the image data memory unit 12 stores image data for a search, a memory area in which the image attribute information memory unit 14 stores image attribute information, and the like.

A display control unit 108 controls to display the display data stored in the RAM 106 on a display 109. The display 109 comprise a cathode ray tube, liquid crystal display, or the like. A character generator 110 generates character images on the basis of character codes, and stores them as the display data in the RAM 106. A network interface 111 connects the image processing apparatus of this embodiment to another image processing apparatus or image database.

An example of the file format of image data to be stored in the image processing apparatus of this embodiment will be presented and explained below.

[FlashPix™ File Format]

Figure 3:
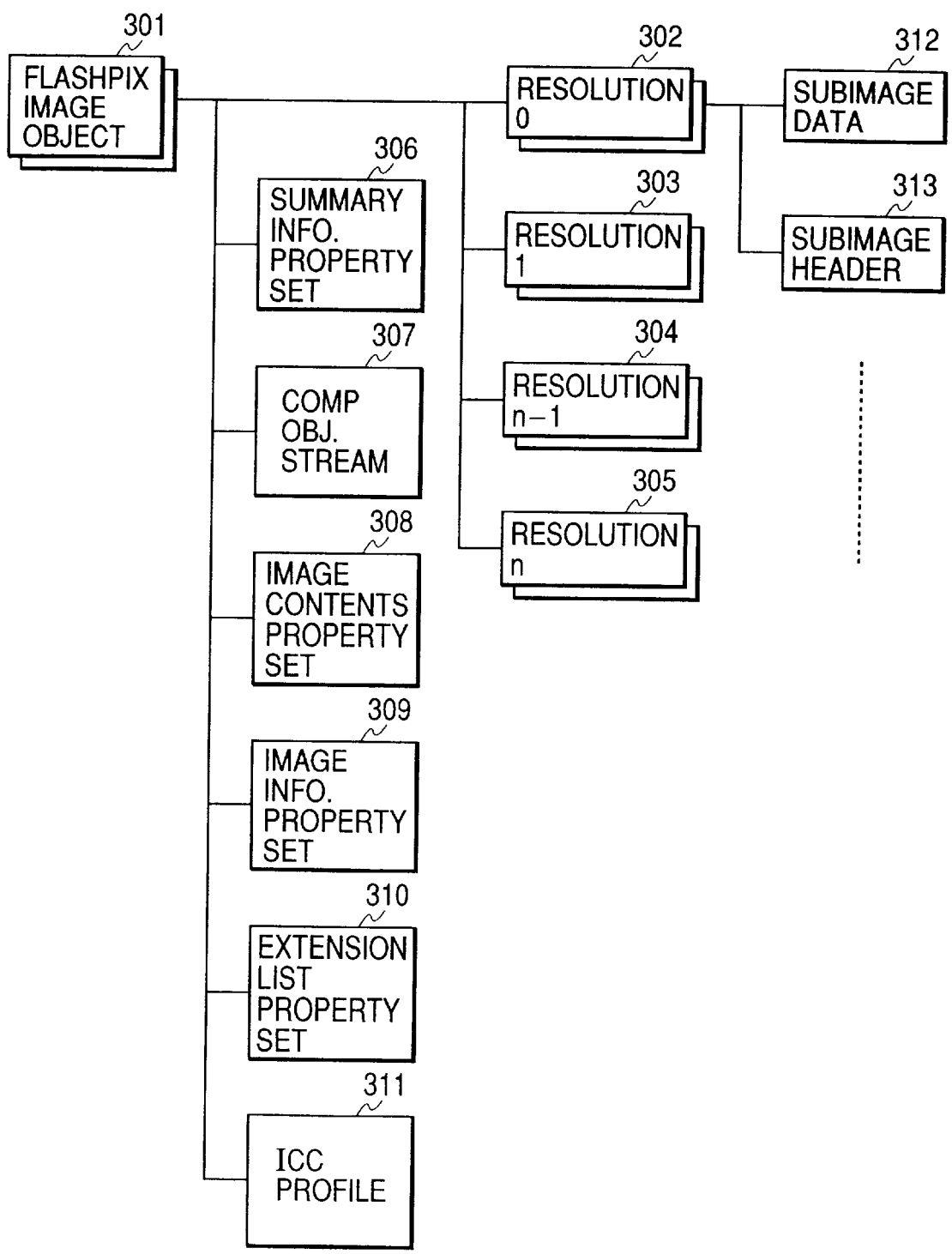
FIG. 3 shows the architecture of a FlashPix image object.
Figure 4:
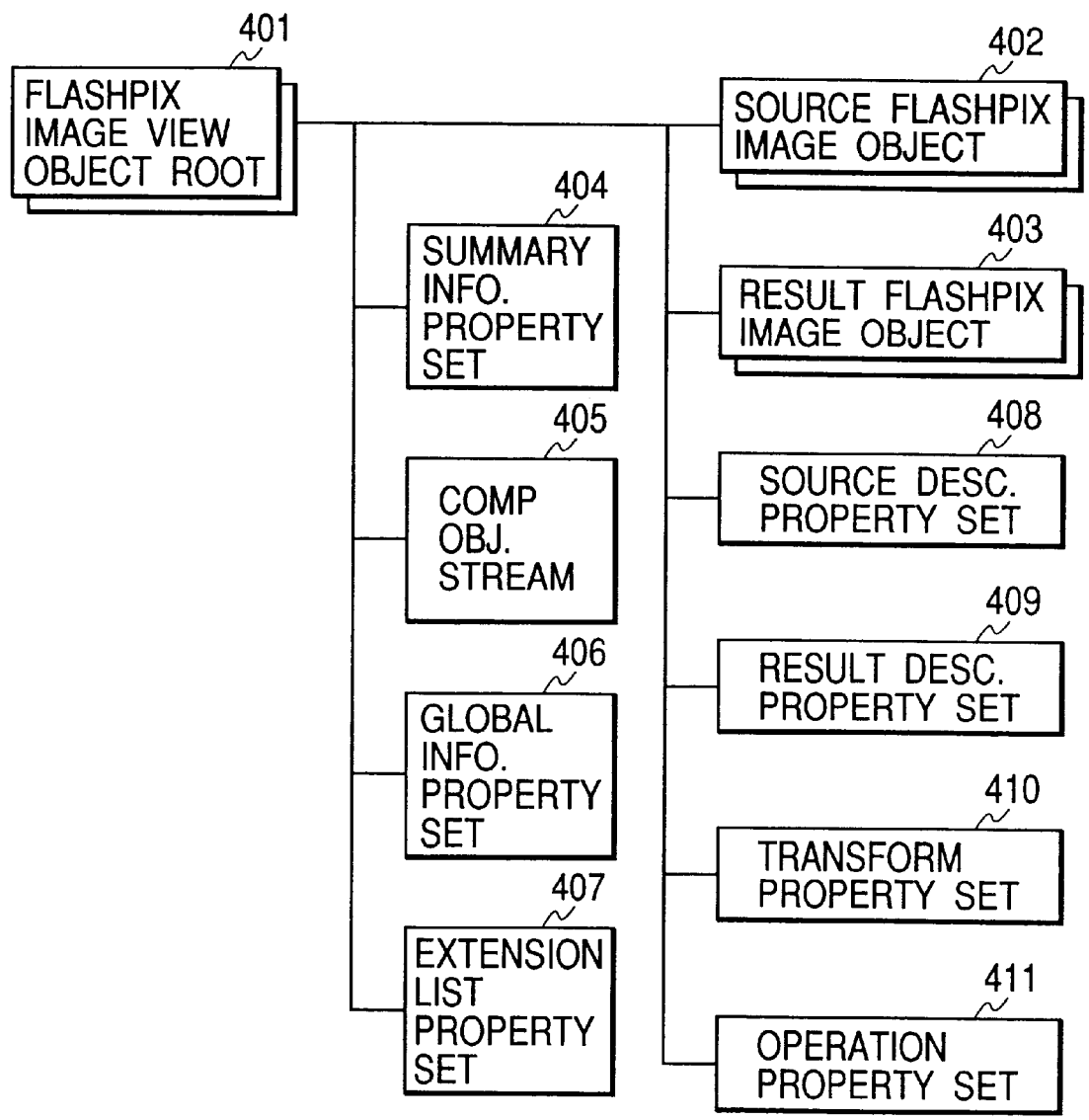
FIG. 4 shows the architecture of a FlashPix image view object.

The FlashPix™ (FlashPix is a trademark of Eastman Kodak Company) file format to be described below structures and stores image attribute information stored in an image header field and image data in a file. FIGS. 3 and 4 show the structured image file.

Properties and data in a file are accessed using "storages" (301 to 305, 401 to 403) and "streams" (306 to 313, 404 to 411) corresponding to directories and files of MS-DOS. In FIGS. 3 and 4, shadowed portions (301 to 305, 401 to 403) correspond to "storage" and non-shadowed portions correspond to "streams" (306 to 313, 404 to 411). Image data and image attribute information are stored in stream fields (306 to 313, 404 to 411). This format has a hierarchy of different resolutions of image data, and an image of each resolution is called Subimage, which is indicated by Resolution 0, 1, . . . , n. Information required for reading out each resolution image is stored in a Subimage header (313 in FIG. 3), and that image data is stored in Subimage data (312 in FIG. 3).

Property sets classify and define image attribute information in correspondence with its use purpose and contents, and include a Summary Info. Property Set (306 in FIG. 3), Image Info. Property set (309 in FIG. 3), Image Contents Property Set (308 in FIG. 3), and Extension list property set (310 in FIG. 3).

[Property Sets]

The Summary Info. Property Set 306 is not unique to the FlashPix format but is indispensable in the Microsoft's structured-storage format, and stores a title, heading, author, thumbnail image, and the like.

The Image Contents Property Set 308 is an attribute that describes the storage method of image data (FIG. 5). This attribute describes the number of layers of image data, the width and height of an image with a maximum resolution, the width, height, and color configuration of the respective resolution images, and the definition of a quantization table·Huffman table used upon JPEG compression.

FIG. 6 shows the format of the Image Info. Property Set 309. The image Info. Property Set 309 stores various kinds of information that can be utilized when an image used, e.g., information indicating how the image is taken in (e.g. the ways of scanning) and how the image is utilized.

Information related to the taking-in method/generation method of digital data (File Source 601)

Information related to the copyright (Intellectual property 602)

Information related to the contents (person, location, and the like in an image) of an image (Content description 603)

Information related to the camera used in photographing (Camera information 604)

Camera settings upon photographing (Per Picture camera settings 605) such as exposure, shutter speed, focal length, use of flush or not, etc.

Information related to the digital camera specific resolution and mosaic filter (Digital camera characterization 606)

Information of the manufacturer's name, product name, type (negative/positive, color/monochrome), and the like of a film (Film description 607)

Information related to the type and size when the original is a book or printed matter (Original document scan description 608)

Information related to the scanner and software used, and the operator in case of a scanned image (Scan device 609).

The Extension list property set 407 is an area used when information which is not included in the basic specification of the FlashPix format is added.

A FlashPix Image View Object shown in FIG. 4 is an image file which stores a viewing parameter used upon displaying an image, and image data together. The viewing parameter is a set of processing parameters which store the rotation, enlargement/reduction, movement, color conversion, and filtering parameters of an image to be applied when the image is displayed.

A Source/Result FlashPix Image Object (402, 403) is the body of FlashPix image data. The Source FlashPix Image object 402 is indispensable, and the Result FlashPix Image object 403 is optional.

The Source FlashPix Image object 402 stores original image data, and the Result FlashPix Image object 403 stores an image as a result of image processing using a given viewing parameter.

A Source/Result desc. Property set (408, 409) is the one for discriminating the above-mentioned image data, and stores an image ID, change inhibition property set, last updated date, and the like.

A Transform property set 410 stores Affine transform coefficients, color conversion matrix, contrast control value, and filtering coefficients for rotation, enlargement/reduction, and movement.

Registration of image data stored using the FlashPix file format will be explained below.

In order to search image data after storage of the image data, some information which serves as a key upon search must be added to each information. As the information serving as a key, information in the Image Info. Property Set 309 of the FlashPix file format is utilized. That is, the image attribute information registration unit 13 extracts information such as a File Source 601, Content description 603, and the like stored in an image data file upon registering image data, and registers the extracted information in a database. At this time, the unit 13 can also extract and register new information to be created such as an image feature which is not included in the image file by, e.g., image processing. The information stored in the Image Info. Property Set 309 includes information which must be manually set by the user, and information which is automatically set by devices (a camera, scanner, and the like) which are used in the process of creating the image. For example, the user who photographed or created the image must fill in the field of the Content Description 603 by himself or herself, but information is automatically stored in the field of the Digital camera characterization 606 depending on the model of digital camera.

FIG. 7 shows a storage example of the Image Info. Property Set 309, which includes "no information" fields. Since some fields must be filled in by the user himself or herself, the Image Info. Property Set 309 includes fields with and without information. For this reason, as a larger number of pieces of information of the Image Info. Property Set are stored, the number of kinds of information serving as keys for a search increases, eventually leading to improved search performance.

Figures 8, 9:
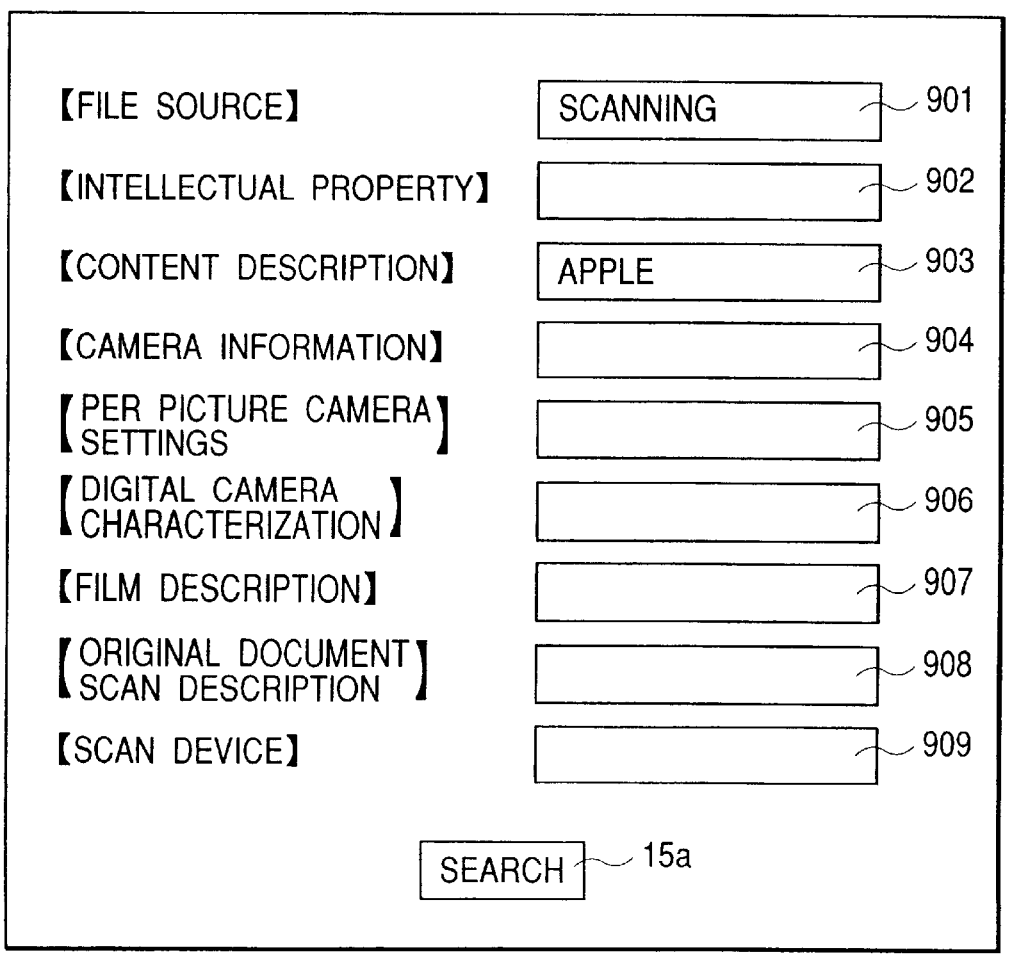
FIG. 8 shows the data format of an image attribute information index 14a used for searching image data and stored in an image attribute information memory unit 14.
FIG. 9 shows a window for conducting a search by inputting key information for an image search.

FIG. 8 shows the data format of an image attribute information index 14a which is stored by the image attribute information memory unit 14 and is used for an image data search. The image attribute information index 14a stores the relationship between image data numbers (802 to 804) of the registered image data, and image attribute information 801 associated with the registered image data.

In this example, the relationship between the Content description 603 included in the Image Info. Property set shown in FIG. 6, and the registered image data is stored. For example, the registered data with image data number AAA is shown to correspond to the Content description "mountain". Such correspondence between the image attribute information and registered image data in the image attribute information index 14a is taken by the image attribute information registration unit 13. That is, the image attribute information registration unit 13 extracts image attribute information stored in image data upon registering that image data, registers the extracted image attribute information in the image attribute information index 14a, and also registers the image data number of that registered image data in correspondence with the image attribute information. When the image attribute information has already been registered in the image attribute information index 14a, the image data number alone is added to the image data number field.

FIG. 9 shows the window used for inputting information serving as a key for an image search, and searching for the image. In FIG. 9, keyword "scanning" is stored in a field "File Source" 901, and keyword "apple" is stored in a field "Content description" 903. More specifically, the user searches for an image "captured by scanning" and "including an apple". After the user inputs the keywords, when he or she presses a search button 15a, a search starts. The image data searching unit 15 searches image data for data that match the search conditions using the image attribute information. At this time, a search may be done using an AND or OR operator for the conditions stored in the individual fields.

Figure 10:
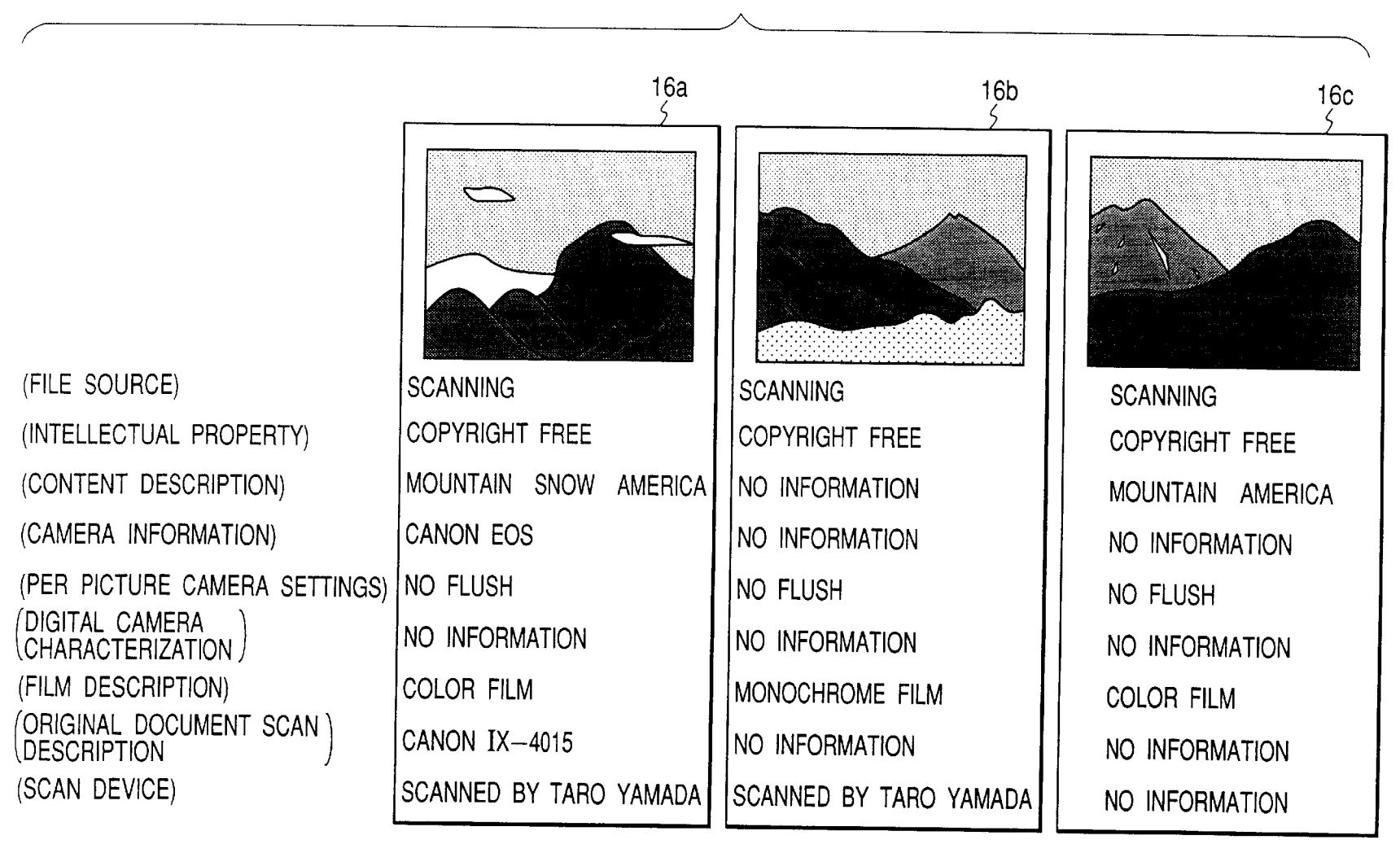

FIG. 10 shows the search result obtained under the search condition "image captured by scanning". More specifically, image data in each of which keyword "scanning" is stored in the field "File Source" in the Image Info. Property Set 309 are output as search results. Information presented beneath each image data corresponds to the Image Info. Property set present in the image data shown in FIG. 6. In all image data 16a, 16b, and 16c output as the search results, keyword "scanning" is stored in the field "File Source". Such search results are displayed by the search result display unit 16.

In FIG. 10, the image data 16a and 16b include "mountain". In the image data 16a, image attribute information "mountain" is stored in the field "Content description", but in the image data 16b, no data is stored in that field. That is, the image data 16b has no description associated with the contents of image. In this state, if the user searches images using keyword "mountain", the image data 16b cannot be obtained as a search result. In order to avoid such situation, new image attribute information is additionally registered in the field including no information using the search results. More specifically, the user selects the image data 16a and 16b using the image data selecting unit 17, and also selects image attribute information "mountain" using the image attribute information selecting unit 18. The selected image attribute information "mountain" stored in the image data 16a is additionally registered in the field "Content description" of the image data 16b. At the same time, this information is also registered in the image attribute information index 14a in the database.

With this processing, when the user conducts the next search of image data using keyword "mountain", the image data 16b is also obtained as the search result.

The operation of the image processing apparatus of this embodiment described above will be described in more detail below with reference to the flow chart in FIG. 11.

Figure 11:
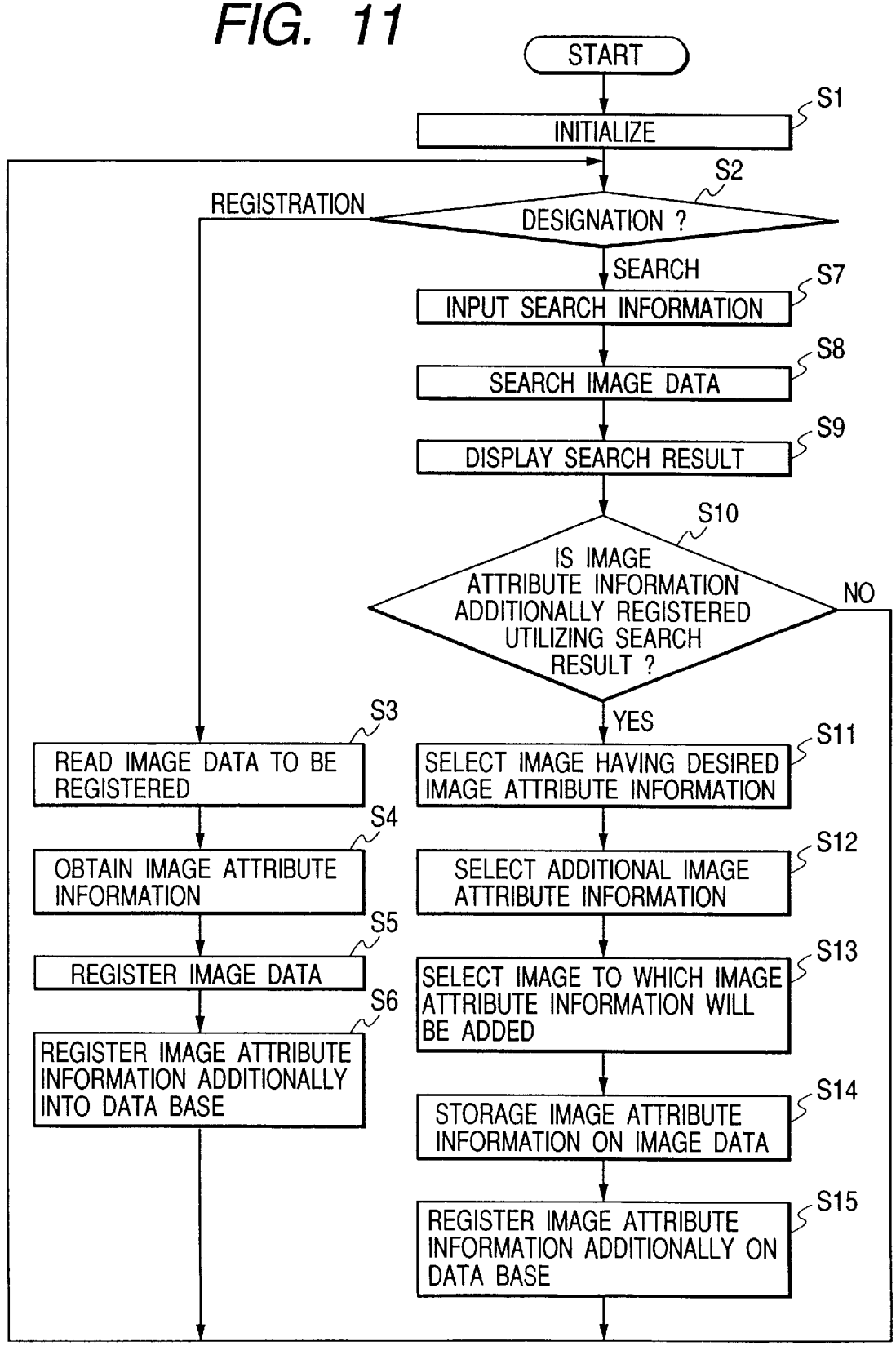
FIG. 11 is a flow chart showing the image data registration & search sequence in the image processing apparatus.

FIG. 11 is a flow chart showing the registration & search sequence of image data of the image processing apparatus. In step S1, the apparatus is initialized. In step S2, the designated processing contents are discriminated. If registration is designated, the flow advances to step S3, and image data to be registered is read. Note that the image data may be read out from the external memory 107, or may be obtained by scanning an original image such as a photograph by operating the scanner 104. Also, the image data may be acquired from an image database or another image processing apparatus on the network. In step S4, the image attribute information registration unit 13 obtains image attribute information corresponding to the image data read in step S3. In step S5, the image data is stored in the external memory 107 as registration image, and is registered by assigning an image data number thereto. Subsequently, the image attribute information is registered in the database in step S6. That is, using the image data number given in step S5, and the image attribute information obtained in step S4, the image attribute information is registered in the image attribute information index 14a.

In this way, image data is registered in the image processing apparatus.

On the other hand, if it is determined in step S2 that a search is designated, the flow advances to step S7 to obtain the input search information. In step S8, the image data searching unit 15 searches image data based on the search information input in step S7. That is, the image data searching unit 15 searches the image attribute information index 14a using the input search information to obtain an image data number registered in correspondence with the input search information. In step S9, the search result display unit 16 displays the search results. That is, the image data and image attribute information registered in correspondence with the image data number obtained in step S8 are displayed, as shown in FIG. 10.

In step S10, it is checked if image attribute information is additionally registered using the search results. If YES in step S10, the flow advances to step S11; otherwise, the flow returns to step S2. In step S11, the image data selecting unit 17 selects image data that stores the image attribute information to be additionally registered. In FIG. 10, the image data 16a corresponds to this image data. In step S12, the image attribute information selecting unit 18 selects the image attribute information to be additionally registered. In FIG. 10, keyword "mountain" corresponds to this image attribute information. In step S13, image data to which the image attribute information selected in step S12 is to be additionally registered is selected. In FIG. 10, the image data 16b corresponds to this image data.

In step S14, the image attribute information selected in step S12 is stored in the image data selected in step S13. That is, new image attribute information is stored in the corresponding field of the Image Info. Property Set. In step S15, the image attribute information selected in step S12 is registered in the database in the same manner as in step S6. That is, the image data number is added to the image attribute information stored in the image attribute information index 14a.

With the above processing, registration and search of image data are done.

The present invention is also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the novel functions of the present invention, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS or the like running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Note that the present invention can also be applied to a case wherein a software program is distributed from a storage medium that stores the software program that implements the functions of the above-mentioned embodiments to a requester via communication infrastructures such as personal computer communications.

To recapitulate, according to the present invention, even when image attribute information is not assigned to all image data upon registration, appropriate image attribute information can be assigned to already registered image data in the course of repeating searches, thus reducing the load on the user upon registration.

What is claimed is:

1. An image processing apparatus comprising:
a memory adapted to store image data and image attribute information corresponding to each image data;
an image data searching unit adapted to search image data; and
an additional registration unit for additionally registering at least one image attribute information of a first image data which is voluntarily selected by a user from among the searched image data, the at least one image attribute information of the first image data being voluntarily selected by the user, and a second image data, different than the first image data, being voluntarily selected by the user from among the image data wherein the additional registration unit additionally registers the selected at least one image attribute information of the first image data to the selected second image data, and
wherein said additional registration unit has an image attribute information selecting unit for selecting image attribute information to be additionally registered.

2. An apparatus according to claim 1, wherein said image data searching unit searches image data using the image attribute information.

3. An apparatus according to claim 1, further comprising an image data registration unit for registering image data.

4. An apparatus according to claim 1, further comprising a search result display unit for displaying image data found by said image data searching unit.

5. An apparatus according to claim 4, wherein said search result display unit displays the image attribute information in addition to image data.

6. An apparatus according to claim 1, wherein said additional registration unit has an image data selecting unit for selecting the second image data to which the selected image attribute information is to be additionally registered.

7. An apparatus according to claim 1, wherein the image attribute information is a keyword assigned to an image.

8. An apparatus according to claim 1, wherein the image attribute information is an image feature amount extracted from an image.

9. An image processing method comprising;

a step of storing image data and image attribute information corresponding to each image data;

a step of searching image data; and a step of additionally registering at least one image attribute information of a first image data which is voluntarily selected by a user from among the searched image data, the at least one image attribute information of the first image data being voluntarily selected by the user, and a second image data, different than the first image data, being voluntarily selected by the user from among the image data wherein the additional registration step additionally registers the selected at least one image attribute information of the first image data to the selected second image data, and wherein said additional registration step has an image attribute information selecting step for selecting image attribute information to be additionally registered.

10. A method according to claim 9, wherein the image data searching step includes the step of searching image data using the image attribute information.

11. A method according to claim 9, further comprising an image data registration step of registering image data.

12. A method according to claim 9, further comprising a search result display step of displaying image data found by said image data searching step.

13. A method according to claim 12, wherein the search result display step includes the step of displaying the image attribute information in addition to image data.

14. A method according to claim 9, wherein the additional registration step has an image data selecting step of selecting the second image data to which the selected image attribute information is to be additionally registered.

15. A method according to claim 9, wherein the image attribute information is a keyword assigned to an image.

16. A method according to claim 9, wherein the image attribute information is an image feature amount extracted from an image.

17. A storage medium storing an executable program code for performing:

a step of storing image data and image attribute information corresponding to each image data;

a step of searching image data; and a step of additionally registering at least one image attribute information of a first image data which is voluntarily selected by a user from among the searched image data, the at least one image attribute information of the first image data being voluntarily selected by the user, and a second image data, different than the first image data, being voluntarily selected by the user from among the image data wherein the additional registration step additionally registers the selected at least one image attribute information of the first image data to the selected second image data, and wherein said additional registration step has an image attribute information selecting step for selecting image attribute information to be additionally registered.

* * * * *

UNITED STATES PATENT AND TRADEMARK OFFICE
CERTIFICATE OF CORRECTION

PATENT NO. : 6,704,464 B2
DATED : March 9, 2004
INVENTOR(S) : Takayoshi Ohdate et al.

It is certified that error appears in the above-identified patent and that said Letters Patent is hereby corrected as shown below:

<u>Column 4,</u>
Line 43, "image" should read -- Image --; and
Line 58, "flush" should read -- flash --.

<u>Column 9,</u>
Line 6, "comprising;" should read -- comprising: --.

Signed and Sealed this

Twenty-fourth Day of August, 2004

JON W. DUDAS
*Director of the United States Patent and Trademark Office*